US012675552B2

(12) United States Patent
Schirmer et al.

(10) Patent No.: US 12,675,552 B2
(45) Date of Patent: Jul. 7, 2026

(54) METHOD AND SYSTEM FOR A CONTINUOUS DISCRETE RECURRENT KALMAN NETWORK

(71) Applicant: Robert Bosch GmbH, Stuttgart (DE)

(72) Inventors: Mona Schirmer, Berlin (DE); Mazin Eltayeb, Renningen (DE); Maja Rudolph, Madison, WI (US)

(73) Assignee: Robert Bosch GmbH (DE)

( * ) Notice: Subject to any disclaimer, the term of this patent is extended or adjusted under 35 U.S.C. 154(b) by 1338 days.

(21) Appl. No.: 17/407,648

(22) Filed: Aug. 20, 2021

(65) Prior Publication Data

US 2023/0057100 A1 Feb. 23, 2023

(51) Int. Cl.
| | |
|---|---|
| *G06F 18/2137* | (2023.01) |
| *G01S 19/47* | (2010.01) |
| *G06F 18/21* | (2023.01) |
| *G06N 3/04* | (2023.01) |
| *G06N 3/084* | (2023.01) |

(52) U.S. Cl.
CPC ........ *G06F 18/21375* (2023.01); *G01S 19/47* (2013.01); *G06F 18/217* (2023.01); *G06N 3/04* (2013.01); *G06N 3/084* (2013.01)

(58) Field of Classification Search
CPC .. G06F 18/21375; G06F 18/217; G01S 19/47; G06N 3/04; G06N 3/084; G06N 3/0455; G06N 3/0464; G06N 3/044
See application file for complete search history.

(56) References Cited

U.S. PATENT DOCUMENTS

| | | | | |
|---|---|---|---|---|
| 11,281,969 | B1* | 3/2022 | Rangapuram | .......... G06N 3/044 |
| 2015/0178834 | A1* | 6/2015 | Co | .......... G06Q 40/04 |
| | | | | 705/37 |
| 2018/0174050 | A1* | 6/2018 | Holt | .......... G06N 3/0464 |
| 2020/0082248 | A1 | 3/2020 | Villegas et al. | |
| 2020/0233920 | A1* | 7/2020 | Meeds | .......... G06N 3/084 |
| 2021/0152754 | A1 | 5/2021 | McCauley et al. | |
| 2021/0156960 | A1 | 5/2021 | Popov et al. | |

(Continued)

FOREIGN PATENT DOCUMENTS

| | | | | |
|---|---|---|---|---|
| CN | 111815053 A | 10/2020 | | |
| WO | WO-2020149992 A1 * | 7/2020 | .......... | G06F 17/13 |

OTHER PUBLICATIONS

Chen, T. Q., Rubanova, Y., Bettencourt, J., Duvenaud, D.: Neural ordinarydifferential equations. In: Advances in Neural Information Processing Systems31, pp. 6571-6583, CurranAssociates, Inc. (2018), 18 pages.

(Continued)

*Primary Examiner* — Chau T Nguyen
(74) *Attorney, Agent, or Firm* — Dickinson Wright PLLC

(57) ABSTRACT

A computer-implemented method utilizing a continuous discrete recurrent Kalman network, wherein the method includes receiving, at an encoder, an input from one or more sensors, wherein the input includes one or more time series data associating data at one or more points in time; outputting, to a Kalman filter, a latent observation and uncertainty estimate in response to the input at the encoder; determining a latent state prior and latent state posterior utilizing the Kalman filter; and outputting, via a decoder, a filtered observation utilizing at least the latent state posterior.

20 Claims, 9 Drawing Sheets

(56)                    References Cited

U.S. PATENT DOCUMENTS

2021/0158158 A1      5/2021  Look et al.
2021/0256358 A1*     8/2021  Deng ..................... G06N 3/045

OTHER PUBLICATIONS

Rubanova, Y., Chen, T. Q., Duvenaud, D .: Latent Ordinary Differential Equa-tions for Irregularly-Sampled Time Series. In: Advances in Neural InformationProcessing Systems 32, pp. 5320-5330, CurranAssociates, Inc. (2019), 21, pages.
Kidger, P., Morrill, J., Foster, J, Lyons, T.: Neural controlled differential equa-tions for irregular time series.arXiv preprint arXiv:2005. 08926 (2020), 25 pages.
De Brouwer, E., Simm, J., Arany, A., Moreau, Y.: GRU-ODE-Bayes: Continu-ous Modeling of Sporadically-Observed Time Series. In: Advances in NeuralInformation Processing Systems 32, pp. 7379-7390, Curran Associates, Inc. (2019), 12 pages.
Axelsson, P., Gustafsson, F.: Discrete-time solutions to the continuous-timedifferential Lyapunov equation with applications to Kalman filtering. IEEETransactions on Automatic Control, 60(3), 632-643 (2014), 12 pages.

* cited by examiner

METHOD AND SYSTEM FOR A CONTINUOUS DISCRETE RECURRENT KALMAN NETWORK

TECHNICAL FIELD

The present disclosure relates to machine learning, including recurrent neural networks that may utilize time series data.

BACKGROUND

Time series data are omnipresent in various fields such as healthcare, climate forecast, and finance. In many application areas, time series naturally come in an irregular fashion. In healthcare for example, lab measurements may be taken at irregular time intervals. This results in sparse observations—a characteristic that challenge well established models for time series such as Recurrent Neural Networks (RNNs). A common heuristic to apply RNNs for this type of data is to impose discrete dynamics by splitting the timeline into equally sized bins.

Recently, steps have been taken towards a more natural modelling of irregular time series. Neural Ordinary Differential Equations introduced continuous formulations of Neural Networks allowing to propagate hidden states in continuous time. Other work has built up on this idea by proposing continuous-time RNNs. However, these approaches cannot react to new observations as their state trajectory is fixed once the parameters are learned.

SUMMARY

A first embodiment discloses a computer-implemented method utilizing a continuous discrete recurrent Kalman network, wherein the method includes receiving, at an encoder, an input from one or more sensors, wherein the input includes one or more time series data associating data at one or more points in time; outputting, to a Kalman filter, a latent observation and uncertainty estimate in response to the input at the encoder; determining a latent state prior and latent state posterior utilizing the Kalman filter; and outputting, via a decoder, a filtered observation utilizing at least the latent state posterior.

A second embodiment discloses a system that includes a continuous discrete recurrent Kalman network that includes an encoder configured to receive an input from one or more sensors, wherein the input includes one or more time series data associating data at one or more points in time. The system further includes a recurrent continuous-discrete Kalman filter configured to receive as output from the encoder, a latent observation and uncertainty estimate in response to the input at the encoder, and further configured to determine latent state prior and latent state posterior. The system also includes a decoder configured to output a filtered observation utilizing at least the latent state posterior.

A third embodiment discloses a system that includes a continuous discrete recurrent Kalman network that includes a processor programmed to receive, at an encoder, an input from one or more sensors, wherein the input includes one or more time series data associating data at one or more points in time. The processor is further programmed to output, to a Kalman filter, a latent observation and an uncertainty estimate in response to the input at the encoder, and determine a latent state prior and latent state posterior utilizing the Kalman filter. The processor is also programmed to output, via a decoder, a filtered observation utilizing at least the latent state posterior.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Previous approaches use continuous formulations of neural networks to account for continuous state dynamics. Instead, the system and method described below may utilize a probabilistic state-space model who's latent state dynamics are governed by a linear stochastic differential equation (SDE). Previous systems may not be able to update dynamics based on new observations, used Controlled Differential Equations or tasked an update network to incorporate new observations. Instead, system and method may utilize the Kalman filter to update a trajectory based on incoming information while considering noise and prior knowledge. Thereby, the system may utilize the optimal solution for the linear filtering problem and can rely on closed form updates. The updates balance prior belief based on previous observations with inherently noisy new observations in an optimal manner.

The present disclosure may utilize a Continuous-Discrete Recurrent Kalman Network (CDRKN), a time-series model that combines the power of neural networks for feature extraction with the advantages of a probabilistic state-space model, specifically the continuous-discrete Kalman filter. The resulting neural architecture can process time-series data like a recurrent neural network by sequentially processing observations and internally updating its internal states. Due to the properties of the continuous-discrete Kalman filter, the model deals with irregular time intervals between observations in a principled manner.

Figure 1:
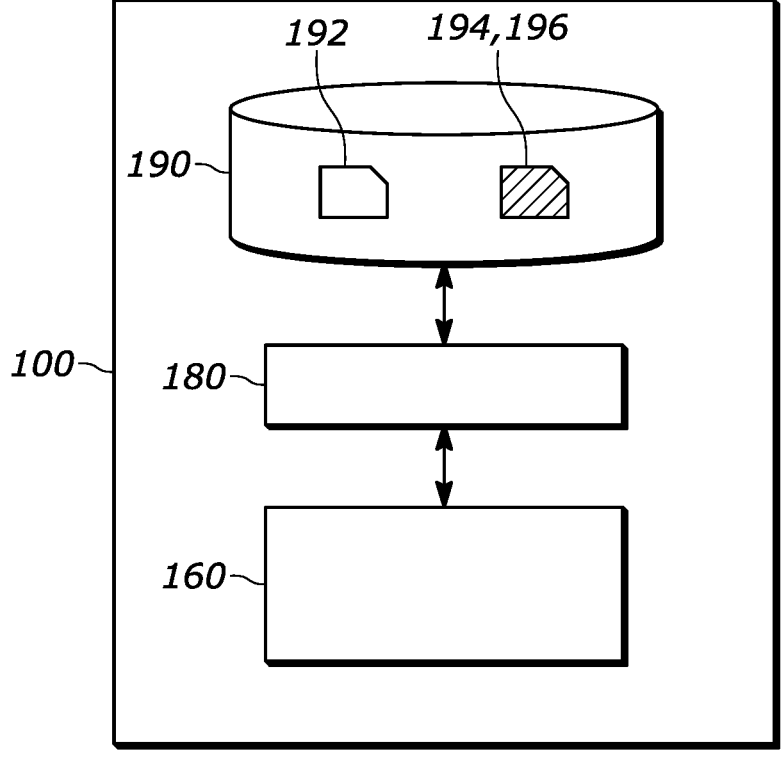
FIG. 1 shows a system 100 for training a neural network.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180, but may in general be of a type as described above for the data storage interface 180.

Figure 2:
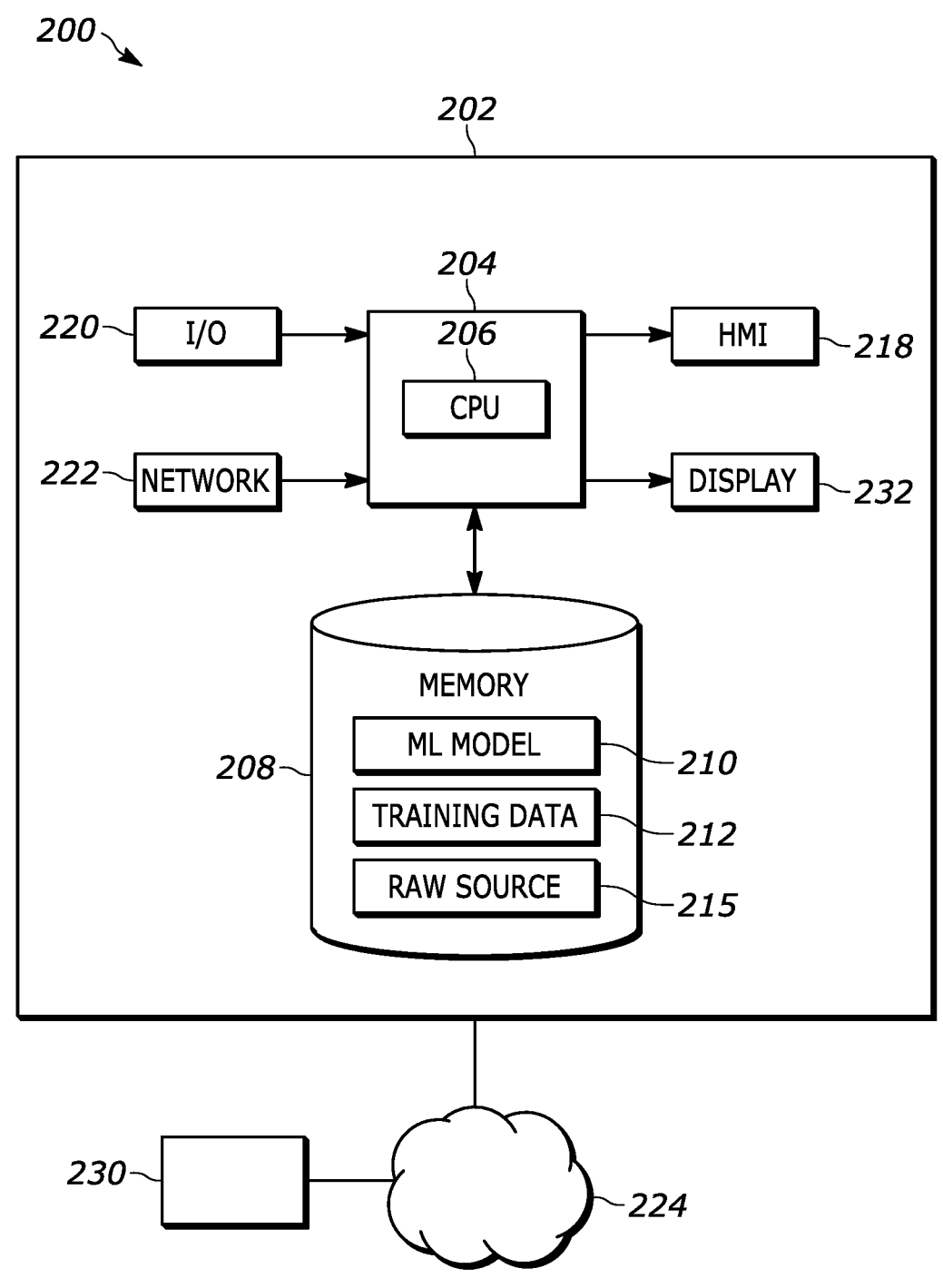
FIG. 2 shows a computer-implemented method 200 for training a neural network.

FIG. 2 depicts a data annotation system 200 to implement a system for annotating data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 215.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards.

The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 330 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 215. The raw source dataset 215 may include raw or unprocessed sensor data that may be representative of an input dataset for a machine-learning system. The raw source dataset 215 may include video, video segments, images, text-based information, and raw or partially processed sensor data (e.g., radar map of objects). In some examples, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 215. The raw source data 215 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 215 to identify the presence of the particular features. The machine-learning algorithm 210 may be configured to identify a feature in the raw source data 215 as a predetermined feature (e.g., pedestrian). The raw source data 215 may be derived from a variety of sources. For example, the raw source data 215 may be actual input data collected by a machine-learning system. The raw source data 215 may be machine generated for testing the system. As an example, the raw source data 215 may include raw video images from a camera.

In the example, the machine-learning algorithm 210 may process raw source data 215 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
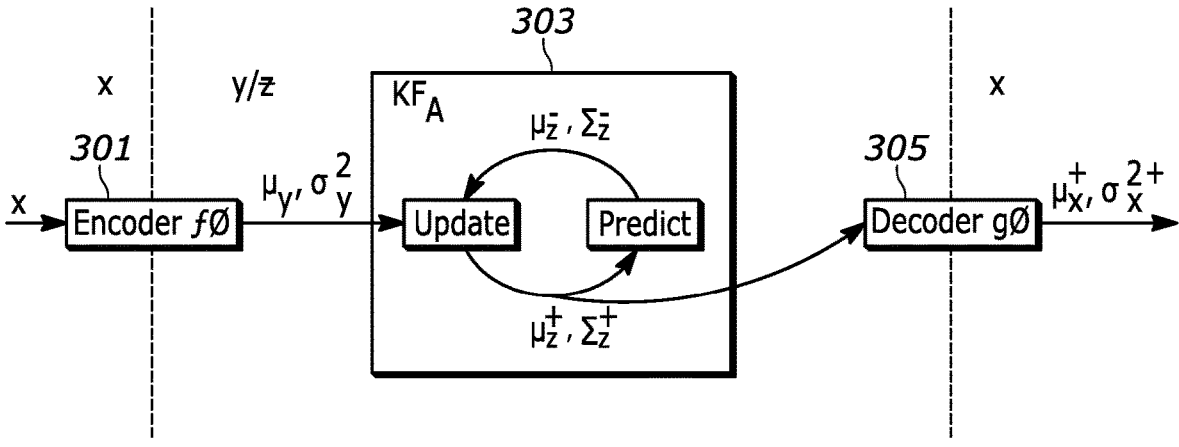
FIG. 3 illustrates an exemplary system diagram of an illustrative continuous-discrete recurrent Kalman network.

FIG. 3 illustrates an exemplary system diagram of an illustrative continuous-discrete recurrent Kalman network. An encoder 301 may be utilized. The encoder 301 may network map the observation x into the latent observation space y returning the latent observation mean $\mu v$ and a component wise uncertainty estimate $\sigma 2y$. The prediction step in the continuous-discrete Kalman filter 303 may solve the SDE in formula (1) up to the current observation time. The resulting latent state prior is updated with the latent observation to the latent state posterior, which the decoder 305 maps back to X. Thus, the output may include a filtered observation.

A continuous-discrete recurrent Kalman network (CDRKN) may include three parts: an encoder, a recurrent continuous-discrete Kalman filter and a decoder. At each time point, an observation is propagated through the three components. The encoder takes as input the observation and maps it to a latent observation space Y and outputs a mean vector along with an uncertainty estimate. Both are passed to the Kalman filter. Here, the prior belief is updated based on the latent observation and its uncertainty estimate (Update step, equations (7)-(9)). The resulting posterior estimate is used to propagate the latent state up to the next observation time (prediction step, equation (4)&(5)). The decoder maps the posterior estimate back to the observation space X and returns either a filtered observation or a prediction of future time steps along with an uncertainty estimate. Our objective function is the Gaussian negative log-likelihood of observations:

$$\mathcal{L}_{\theta,\phi,A}(x_{1:T}) = -\frac{1}{T}\sum_{t=1}^{T} \log \mathcal{N}\left(x_t \big| \mu_x^+, \sigma_x^{2+}I\right)$$

The model parameters $(\theta, \phi, A)$ can be trained with back-propagation in an end-to-end manner. The transition model A can be linear or alternatively be designed as a locally linear transition model. In the latter case, the transition matrix $A(t)$ at time t can for example be constructed as a time-dependent, weighted average of K constant transition matrices. One important part of the method and system is the continuous-discrete Kalman filter which ensures continuous state propagation. The encoder and decoder may vary depending on the application. For example, to process image sequences the encoder and decoder may consists of Convolutional Neural Networks. In order to process scalar time series a sequence of fully connected layers may be used.

Figure 4:
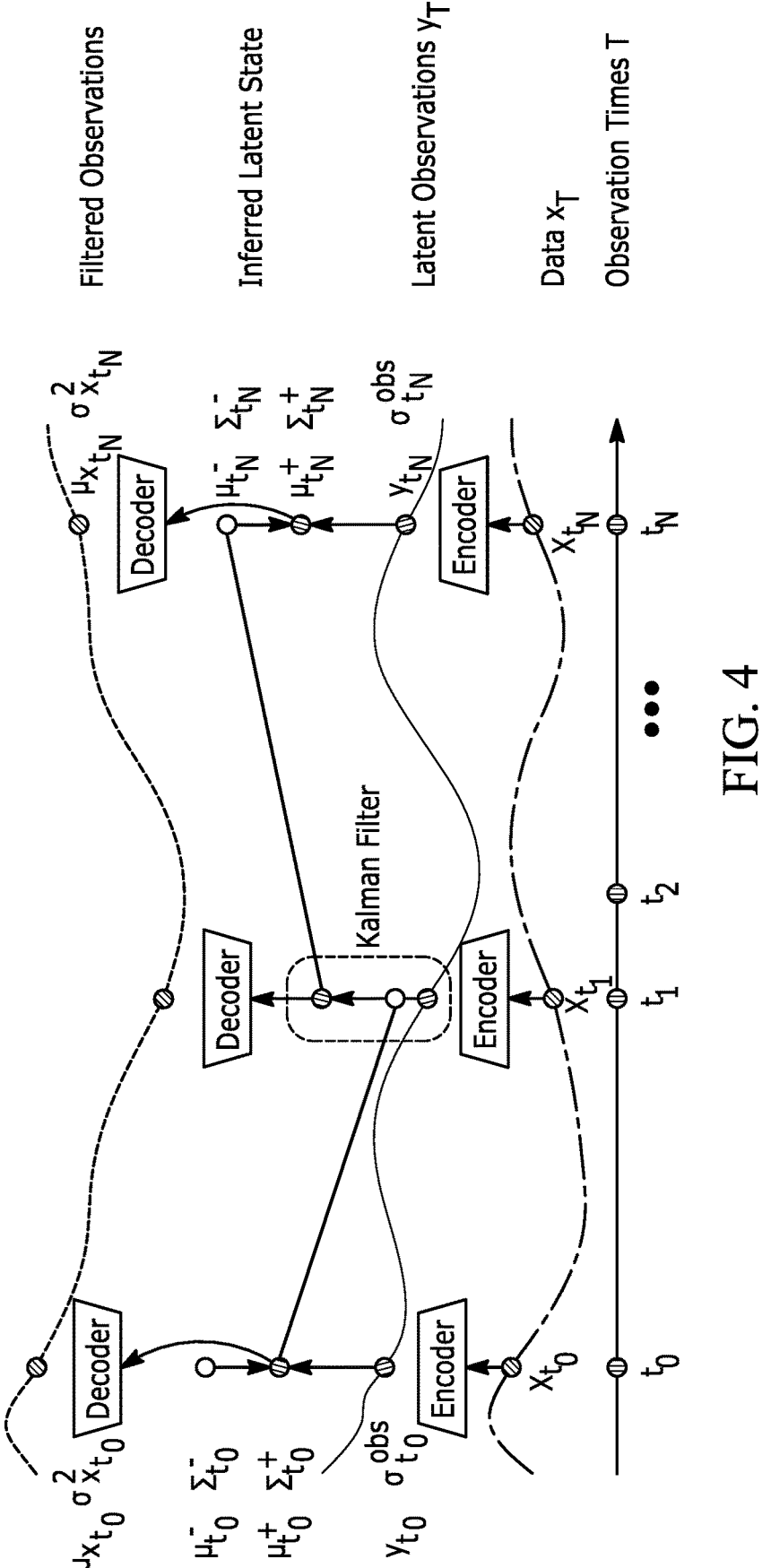
FIG. 4 illustrates a continuous-discrete recurrent Kalman network based over time.

FIG. 4 illustrates a continuous-discrete recurrent Kalman network based over time. The graph is over an observation time. The encoder network may map the observation $x_t$ to a latent observation $y_t$ and returns an elementwise uncertainty estimate. FIG. 4 illustrates the network architecture, that may include an encoder and decoder relate observation space with a latent state space. A continuous-discrete Kalman filter may alternate between observation updates and continuous state propagation. The continuous-discrete Kalman filter may assume a continuous latent state $z \in$ RM that evolves according to the SDE:

$$dz = Az\,dt + G\,d\beta \qquad \text{(Formula 1)}$$

where $A \in$ RM×M is a time-invariant transition matrix, $\beta \in$ RB a Brownian motion process with diffusion matrix $Q \in R^{B \times B}$ and diffusion coefficient $G \in R^{M \times B}$. At times $t \in$ T an observation $y_t \in$ RD may be sampled from the latent state $$y_t \sim N\left(Hz_t, \sum{}^{obs}\right) \qquad \text{(Formula 2)}$$

where $H \in$ RD×M denotes the observation model. The noise components of $y_t$, $z_t$ and the initial state $z,0$ are assumed to be independent. This version of the Kalman filter allows modelling discrete observations at potentially arbitrary time-intervals as samples from a continuous trajectory of z. Posterior estimates of the latent state can be obtained by Bayes' theorem in a recurrent two-step procedure.

The CDRKN may address the challenge of modeling a time series $x_T = [x_t | t \in T = \{t_0, t_1, t_N\}]$ whose observation times $T = \{t_0, t_1, t_N\}$ can occur at irregular intervals. It assumes a continuous latent state z $R^M$ whose dynamics are governed by a linear SDE.

Between observations the prior density describes the evolution of the latent state. It is governed by the SDE in (Formula 1). For linear, time-invariant systems—as it is the case here—the SDE has an analytical solution. After an observation at time t the solution of the SDE for t>t is given by $$z_{t'} = \exp(A(t'-t))z_t + \int_t^{t'} \exp(A(t'-\tau))G\,d\beta_\tau \qquad \text{(Formula 3)}$$

From here, the prior density at time t is $$p\left(z_{t'} \mid y_t\right) = N\left(\mu_{t'}, \sum{}_{t'}\right)$$

with $$\mu_{t'} = \exp(A(t'-t))\mu_t^+ \qquad \text{(Formula 4)}$$

$$\sum{}_{t'}^{-} \exp(A(t'-t)) \sum{}_t^{+} \exp(A(t'-t))^T + \qquad \text{(Formula 5)}$$

$$\int_t^{t'} \exp(A(t'-\tau))GQG^T \exp(A(t'-\tau))^T d\tau$$

where $\exp(\bullet)$ denotes the matrix exponential and $(\mu^+, \Sigma^+)$ the posterior mean and variance of the latent state at the last observation time t. Note that the integral in Formula 5 can be computed analytically using matrix fraction decomposition. The system and method may summarize the prediction step for the parameters of the prior $$p\left(z_{t'} \mid y_t\right) = N\left(\mu_{t'}, \sum{}_{t'}\right)$$

as $$\left[\mu_{t'}^{-}, \sum{}_{t'}^{-}\right] = \text{predict}_A\left(\mu_t^+, \sum{}_t^+ | G, Q\right) \qquad \text{(Formula 6)}$$

where the transition matrix A is learned and G and$_0$Q are given. The initial conditions are hyper-parameters and set to $$\mu_T = 0 \text{ and } \sum{}_{T} = 10^4.$$

At a time of a new observation t, the prior may be updated by Bayes' theorem.

$$p(z_{t'} | y_{t'}) = \frac{p(y_{t'} | z_{t'}) p(z_{t'} | y_t)}{p(y_{t'} | y_t)} \qquad \text{(Formula 7)}$$

Thanks to the Gaussian assumption all quantities are known and the posterior density at time $t \in T$ is given by $p(z_t|y_t) = N(\mu^+, \Sigma^+)$ with $$\mu_t^+ = \mu_t^- + K_t(y_t - H\mu_t^-) \qquad \text{(Formula 8)}$$

$$\sum\nolimits_t^+ = (I - K_t H) \sum\nolimits_t^- \qquad \text{(Formula 9)}$$

$$K_t = \sum\nolimits_t^- H^T \left( H \sum\nolimits_t^- H^T + \sum\nolimits_t^{obs} \right)^{-1} \qquad \text{(Formula 10)}$$

The system may summarize these updates as the following:

$$\left[ \mu_c^+, \sum\nolimits_t^+ \right] = \text{update}\left( \mu_t^-, \sum\nolimits_t^- y_t, \sum\nolimits_t^{obs} | H \right) \qquad \text{(Formula 11)}$$

The CDRKN may include an encoder an encoder $f_\theta$, a recurrent continuous-discrete Kalman filter and a decoder $g_\varphi$. At each time point $t \in T$, an observation is prop-agated through the three components: A nonlinear function $f_\theta$ parametrized by a neural network maps the observation $x_t$ to a latent observation space and outputs a transformed observation $y_t$ along with an elementwise uncertainty estimate $$\sigma_t^{obs}.$$

$$\text{encoder: } \left[ y_t, \sigma_t^{obs} = f_\theta(x_t) \right] \qquad (12)$$

The Kalman filter updates the latent state prior using the latent observation and its uncertainty estimate (update step shown in Formulas 8-10 above). The system may propagate the resulting posterior up to the next observation time t '(prediction step shown in Formulas 4 and 5).

$$\left[ \mu_c^+, \sum\nolimits_t^+ \right] = \text{update}\left( \mu_t^-, \sum\nolimits_t^- y_t, \sigma_t^{obs} I | H \right)$$

$$\left[ \mu_{t'}^-, \sum\nolimits_{t'}^- \right] = \text{predict}_A\left( \mu_t^+, \sum\nolimits_t^+ | G, Q \right) \qquad \text{(Formula 13)}$$

The decoder may map the posterior estimate back to the observation space and return either a filtered observation or a prediction of future time steps along with an elementwise uncertainty estimate.

$$\text{Decoder: } \left[ \mu_{x_t, \sigma_{x_t}^2} \right] = g_\phi\left( \mu_t^+, \sum\nolimits_t^+ \right) \qquad \text{(Formula 14)}$$

An objective function may be the Gaussian negative log-likelihood of observations $X_T$ $$\mathcal{L}_{\theta,\phi,A}(X_T) = -\frac{1}{N} \sum\nolimits_{t \in T} \log N\left( x_t | \mu_{x_t}, \sigma_{x_t}^2 I \right) \qquad \text{(Formula 15)}$$

The model parameters $(\theta, \varphi, A)$ can be trained with backpropagation in an end-to-end manner. In the current version of the model, the Brownian motion $\beta$, the latent state z and the latent observation y operate in the same space and $H=G=I$. For now, Q is also kept fixed at $\lambda I$.

The system and method can be used by operating on time series data, which may be obtained by receiving sensor signals, e.g, GPS signals (such as those from vehicles or mobile devices), or emissions of engine. Many of those examples are shown in the illustrative FIGS. 5-11. Accurate forecasting models of typical driving behavior, of typical pollution levels over time, or of the dynamics of an engine can help both lawmakers and/or automotive engineers to develop solutions for cleaner mobility.

Another application may include video classification. The system and method may utilize existing methods to extract event-based features from the video (e.g. object tracking, or detect certain events), based on the event based-features learning forecasting model, or on unseen videos. In one example, after watching the first few frames (and extracting the features) the CDRKN can predict a plausible continuation of the features. These forecasts can be used for video classification. Such forecasted features may be fed into a classifier with different possible effects based on the use-case (predict traffic incidents or an accident about to happen [if accident likely, dispatch emergency support], predict scene violent/nonviolent [if violent, turn off video]), etc.

In another example, the system may use sensor measurements (e.g. video, LIDAR, communication with other smart-vehicles or smart-city devices) to extract features about other traffic participants and surrounding objects. Features could be 3D-world coordinates, coordinates relative to ego-vehicle, of surrounding objects and traffic participants. The system and method may train CDRKN on such extracted features. A trained model can then be used in a vehicle, when the new sensor measurements are recorded, features need to be extracted and these can then be forecasted by CDRKN into the future. These forecasts can trigger different behaviors of the ECU; slowing down, emergency break, etc.

In yet another embodiment, the system may use sensor measurements (e.g. video, steering, breaking, communication with driver's smart-watch) to extract features about the driver. Features could be, for example, steering, accelera-tion, eye-movement, heart rate. The system can train CDRKN on such extracted features. A trained model can then be used in a vehicle. Thus, when new sensor measure-ments are recorded, features need to be extracted and these can then be forecasted by CDRKN into the future. These forecasts can trigger different behaviors of the ECU, such as slowing down, emergency break, etc.

In another embodiment with respect to vehicle engines, the system may use sensor measurements (e.g. from ECU) to extract features about the engine dynamics. Features could be any of the ECU parameters and derived quantities. The system and method can train a CDRKN on such extracted features. A trained model can then be used in a vehicle. In one example, when new sensor measurements are recorded, features need to be extracted and these can then be forecasted by CDRKN into the future. These forecasts can trigger different behaviors of the ECU; slowing down, emergency break, etc.

Another application may include battery state of health. In one embodiment, the system and method may track route features and features of driver behavior (e.g. speed and elevation of the route). The model may train the CDRKN on such features.

Another application may include internet of things, such as smart-home appliances or smart-manufacturing. The system may collect and track sensor measurements and use them and derived quantities as features. Define critical thresholds for some of those features (e.g. min oxygen levels, max temperature, etc.). Thus, the system may collect data and train the CDRKN. Then when new measurements come in, the system can use the CDRKN to create a forecast. If critical treshhold is likely to be violated within specified time horizon, the system may execute an emergency action (e.g. stop production line, open valve to let in e.g. fresh oxygen, open window, lock emergency doors).

Another application may be the utilization of digital twins. The system may use a prototype of a new engineering device (e.g. power tool, home appliance, new engine design, etc.) and collect data from internal sensors of the device and/or external sensors e.g. video, LIDAR) under normal usage. The system may utilize these measurements and/or derived quantities as features and then train a CDRKN on these features. Forecasted behavior can be utilized to find anomalies in device behavior (e.g. energy consumption too high, device breaks too soon, overheats, etc.). Should a device be expected to show undesired behavior, it can be shut off automatically, or its settings could be switched into safe mode.

Another example of the system and method may be for resource allocation. The system may measure demand in different nodes of the network (e.g. computer network, telecommunications network, wireless network). The system may also measure other measurements at the nodes (e.g. temperature, time of day) and/or derived quantities as features. The system may record these measurements and train a CDRKN model. Then on new data, the system may use CDRKN to predict a demand. If demand is predicted to surpass a critical threshold at a certain node, the system may utilize additional resource allocation. Apart from resource allocation, load prediction may also be needed for congestion control and routing algorithms. At each access point of a wireless network, resources such as spectrum and transmission power may be highly limited and are allocated on-demand. Briefly, based on the user's application type (e.g., an IoT user or a mobile user), quality of service requirement (e.g., data rate, reliability, latency), communication channel condition (signal to interference and noise ratio) and etc., the resource allocator may assign it with the corresponding transmission time slot, frequency, power and also the transmission format. A load prediction algorithm may be helpful for a timely allocation of resources, e.g., reserving spectrum if latency critical traffic is foreseen. To serve the ever increasing number of users under more stringent quality of service requirements, load prediction and resource allocation may become more demanding in telecommunication settings, such as 5G and beyond.

Another application for the system and method may include medical devices. The system may be utilized to track a patient's treatment regimen and/or vital signals. This may be done, for example, in the ICU or at home via smart tracking devices, home exercise equipment etc. The system may learn to forecast these tracked signals (or derived features of the tracked signals) and use them for personalized medicine (e.g., treatment recommendation, dispatch emergency, trigger phone calls with physician, or other outcomes).

Figure 5:
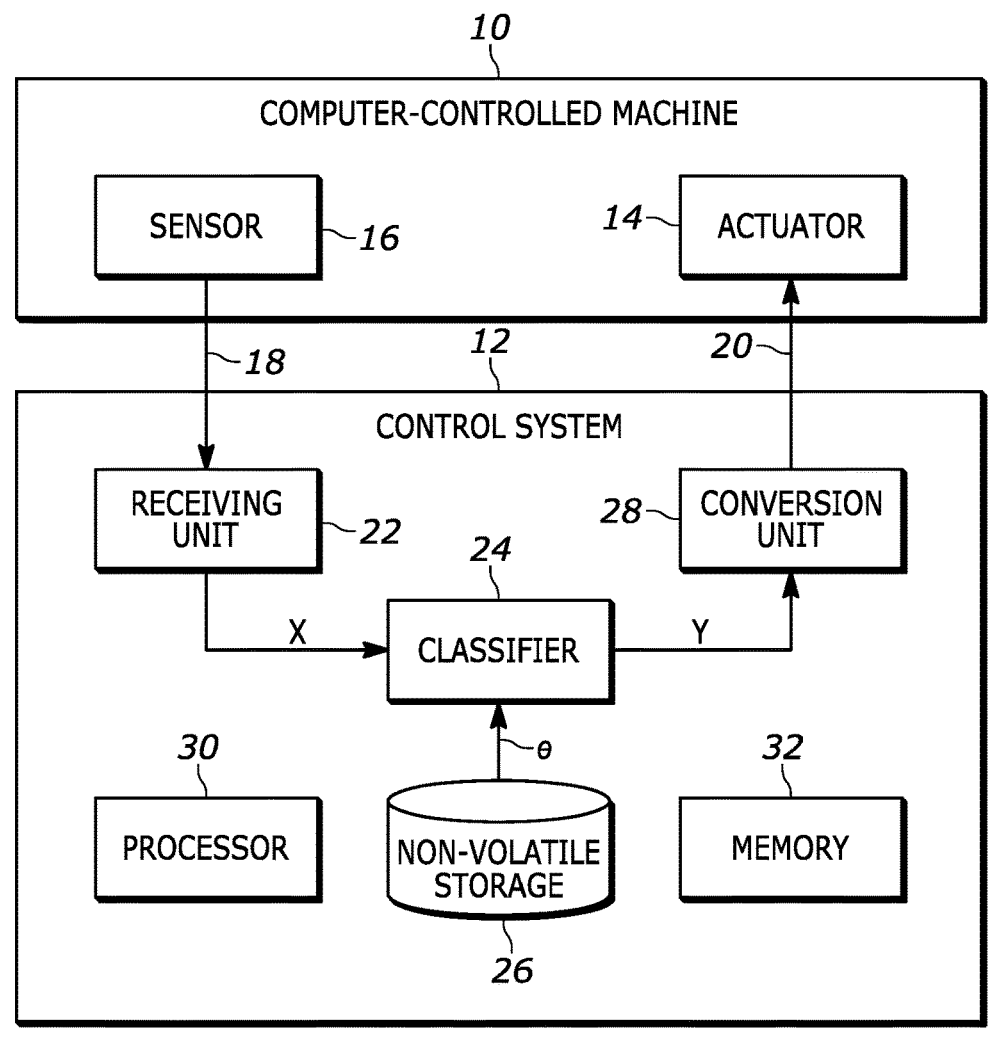
FIG. 5 depicts a schematic diagram of an interaction between computer-controlled machine 10 and control system 12.

FIG. 5 depicts a schematic diagram of an interaction between computer-controlled machine 10 and control system 12. The computer-controlled machine 10 may include a neural network as described in FIGS. 1-4. The computer-controlled machine 10 includes actuator 14 and sensor 16. Actuator 14 may include one or more actuators and sensor 16 may include one or more sensors. Sensor 16 is configured to sense a condition of computer-controlled machine 10. Sensor 16 may be configured to encode the sensed condition into sensor signals 18 and to transmit sensor signals 18 to control system 12. Non-limiting examples of sensor 16 include video, radar, LiDAR, ultrasonic and motion sensors. In one embodiment, sensor 16 is an optical sensor configured to sense optical images of an environment proximate to computer-controlled machine 10.

Control system 12 is configured to receive sensor signals 18 from computer-controlled machine 10. As set forth below, control system 12 may be further configured to compute actuator control commands 20 depending on the sensor signals and to transmit actuator control commands 20 to actuator 14 of computer-controlled machine 10.

As shown in FIG. 5, control system 12 includes receiving unit 22. Receiving unit 22 may be configured to receive sensor signals 18 from sensor 16 and to transform sensor signals 18 into input signals x. In an alternative embodiment, sensor signals 18 are received directly as input signals x without receiving unit 22. Each input signal x may be a portion of each sensor signal 18. Receiving unit 22 may be configured to process each sensor signal 18 to product each input signal x. Input signal x may include data corresponding to an image recorded by sensor 16.

Control system 12 includes classifier 24. Classifier 24 may be configured to classify input signals x into one or more labels using a machine learning (ML) algorithm, such as a neural network described above. Classifier 24 is configured to be parametrized by parameters, such as those described above (e.g., parameter $\theta$). Parameters $\theta$ may be stored in and provided by non-volatile storage 26. Classifier 24 is configured to determine output signals y from input signals x. Each output signal y includes information that assigns one or more labels to each input signal x. Classifier 24 may transmit output signals y to conversion unit 28. Conversion unit 28 is configured to covert output signals y into actuator control commands 20. Control system 12 is configured to transmit actuator control commands 20 to actuator 14, which is configured to actuate computer-controlled machine 10 in response to actuator control commands 20. In another embodiment, actuator 14 is configured to actuate computer-controlled machine 10 based directly on output signals y.

Upon receipt of actuator control commands 20 by actuator 14, actuator 14 is configured to execute an action corresponding to the related actuator control command 20. Actuator 14 may include a control logic configured to transform actuator control commands 20 into a second actuator control command, which is utilized to control actuator 14. In one or more embodiments, actuator control commands 20 may be utilized to control a display instead of or in addition to an actuator.

In another embodiment, control system 12 includes sensor 16 instead of or in addition to computer-controlled machine 10 including sensor 16. Control system 12 may also include actuator 14 instead of or in addition to computer-controlled machine 10 including actuator 14.

As shown in FIG. 5, control system 12 also includes processor 30 and memory 32. Processor 30 may include one or more processors. Memory 32 may include one or more memory devices. The classifier 24 (e.g., ML algorithms) of one or more embodiments may be implemented by control system 12, which includes non-volatile storage 26, processor 30 and memory 32.

Non-volatile storage 26 may include one or more persistent data storage devices such as a hard drive, optical drive, tape drive, non-volatile solid-state device, cloud storage or any other device capable of persistently storing information. Processor 30 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 32. Memory 32 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 30 may be configured to read into memory 32 and execute computer-executable instructions residing in non-volatile storage 26 and embodying one or more ML algorithms and/or methodologies of one or more embodiments. Non-volatile storage 26 may include one or more operating systems and applications. Non-volatile storage 26 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 30, the computer-executable instructions of non-volatile storage 26 may cause control system 12 to implement one or more of the ML algorithms and/or methodologies as disclosed herein. Non-volatile storage 26 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
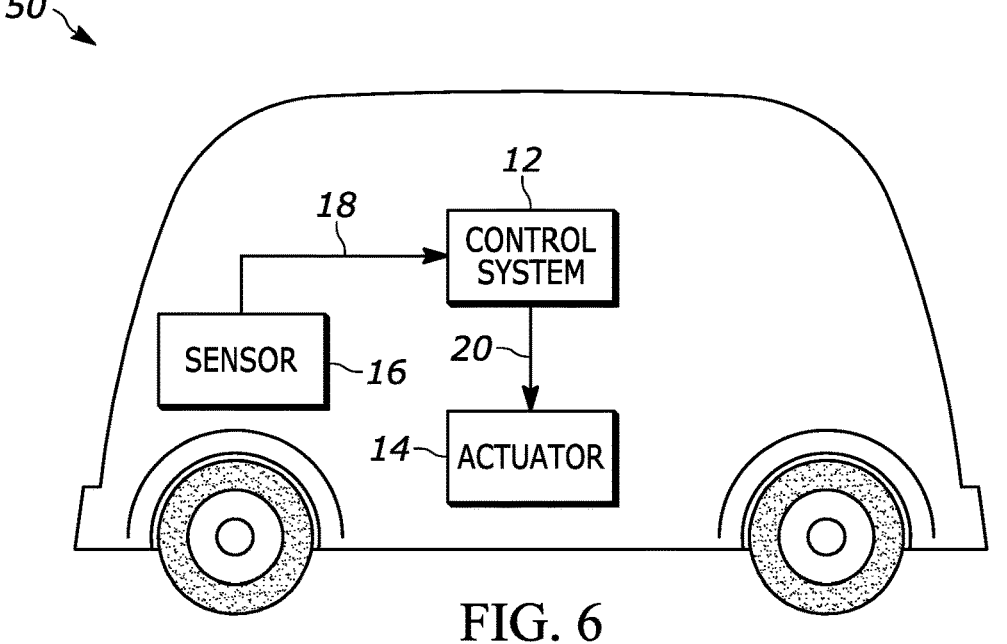
FIG. 6 depicts a schematic diagram of the control system of FIG. 1 configured to control a vehicle, which may be a partially autonomous vehicle or a partially autonomous robot.

FIG. 6 depicts a schematic diagram of control system 12 configured to control vehicle 50, which may be an at least partially autonomous vehicle or an at least partially autonomous robot. As shown in FIG. 5, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively or in addition to one or more specific sensors identified above, sensor 16 may include a software module configured to, upon execution, determine a state of actuator 14. One non-limiting example of a software module includes a weather information software module configured to determine a present or future state of the weather proximate vehicle 50 or other location.

Classifier 24 of control system 12 of vehicle 50 may be configured to detect objects in the vicinity of vehicle 50 dependent on input signals x. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. The actuator control commands 20 may be determined depending on the classification. In a scenario where an adversarial attack may occur, the system described above may be further trained to better detect objects or identify a change in lighting conditions or an angle for a sensor or camera on vehicle 50.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

Figure 7:
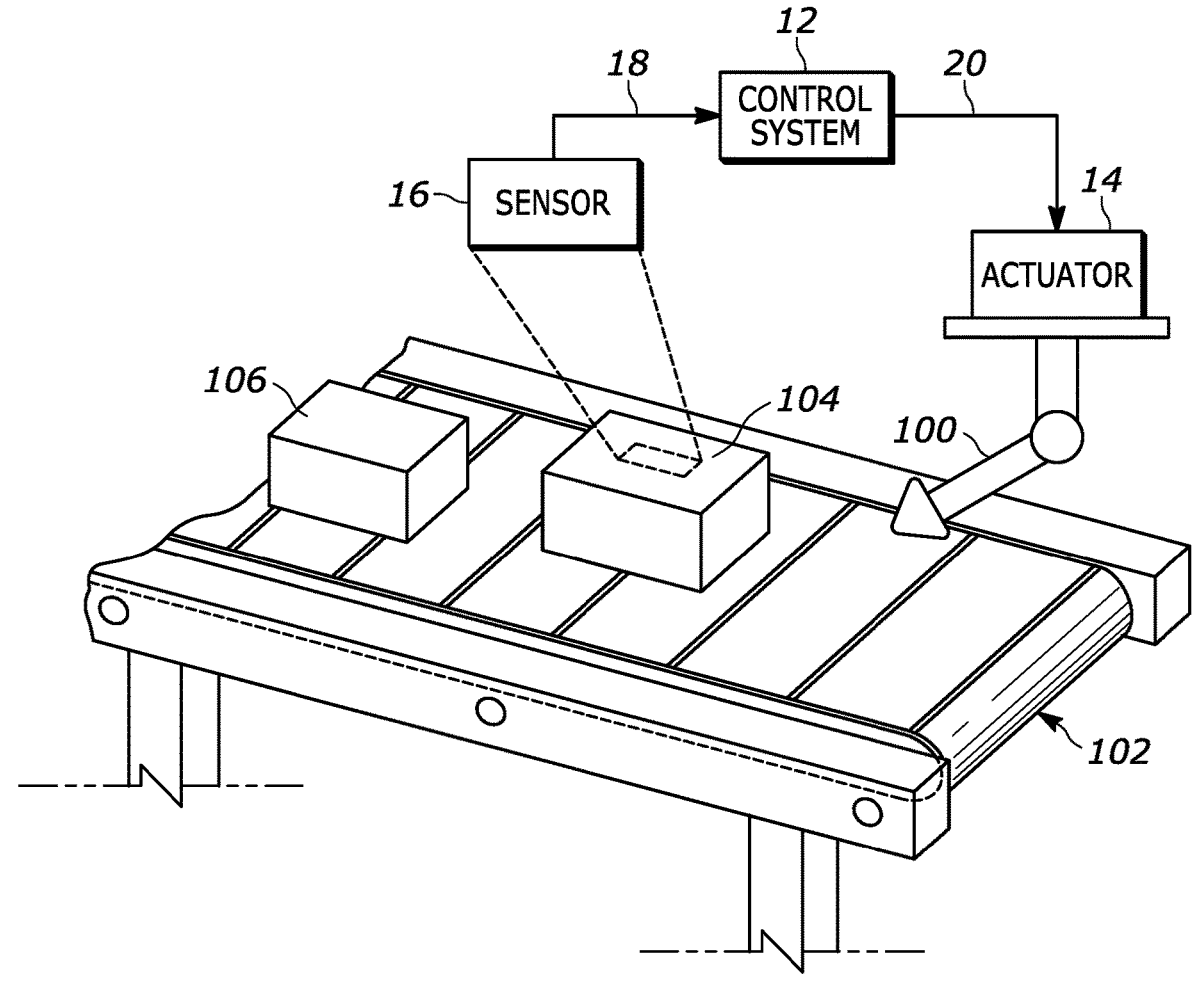
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 12 configured to control system 100 (e.g., manufacturing machine), such as a punch cutter, a cutter or a gun drill, of manufacturing system 102, such as part of a production line. Control system 12 may be configured to control actuator 14, which is configured to control system 100 (e.g., manufacturing machine).

Sensor 16 of system 100 (e.g., manufacturing machine) may be an optical sensor configured to capture one or more properties of manufactured product 104. Classifier 24 may be configured to determine a state of manufactured product 104 from one or more of the captured properties. Actuator 14 may be configured to control system 100 (e.g., manufacturing machine) depending on the determined state of manufactured product 104 for a subsequent manufacturing step of manufactured product 104. The actuator 14 may be configured to control functions of system 100 (e.g., manufacturing machine) on subsequent manufactured product 106 of system 100 (e.g., manufacturing machine) depending on the determined state of manufactured product 104.

Figure 8:
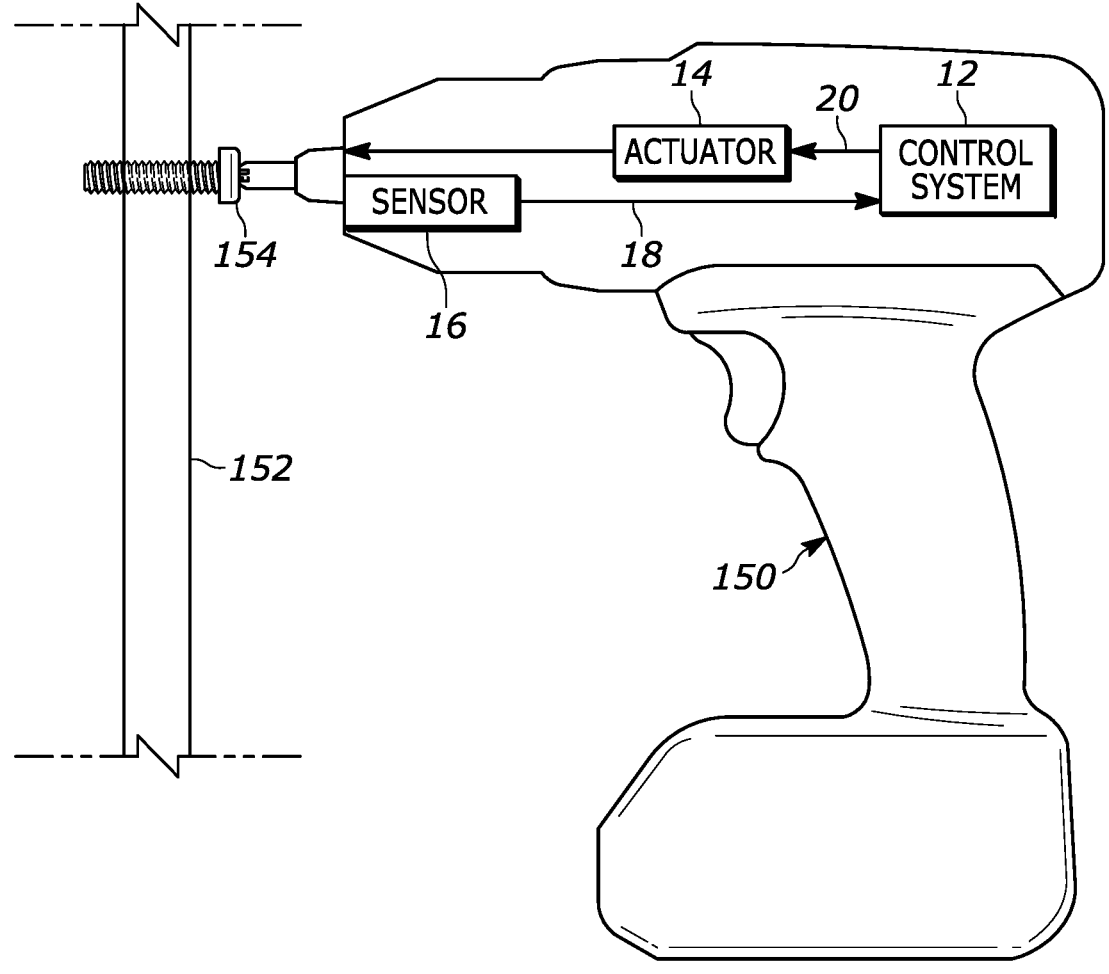
FIG. 8 depicts a schematic diagram of the control system of FIG. 1 configured to control a power tool, such as a power drill or driver, that has an at least partially autonomous mode.

FIG. 8 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. The state may be fastener 154 being flush with work surface 152. The state may alternatively be hardness of work surface 152. Actuator 14 may be configured to control power tool 150 such that the driving function of power tool 150 is adjusted depending on the determined state of fastener 154 relative to work surface 152 or one or more captured properties of work surface 152. For example, actuator 14 may discontinue the driving function if the state of fastener 154 is flush relative to work surface 152. As another non-limiting example, actuator 14 may apply additional or less torque depending on the hardness of work surface 152.

Figure 9:
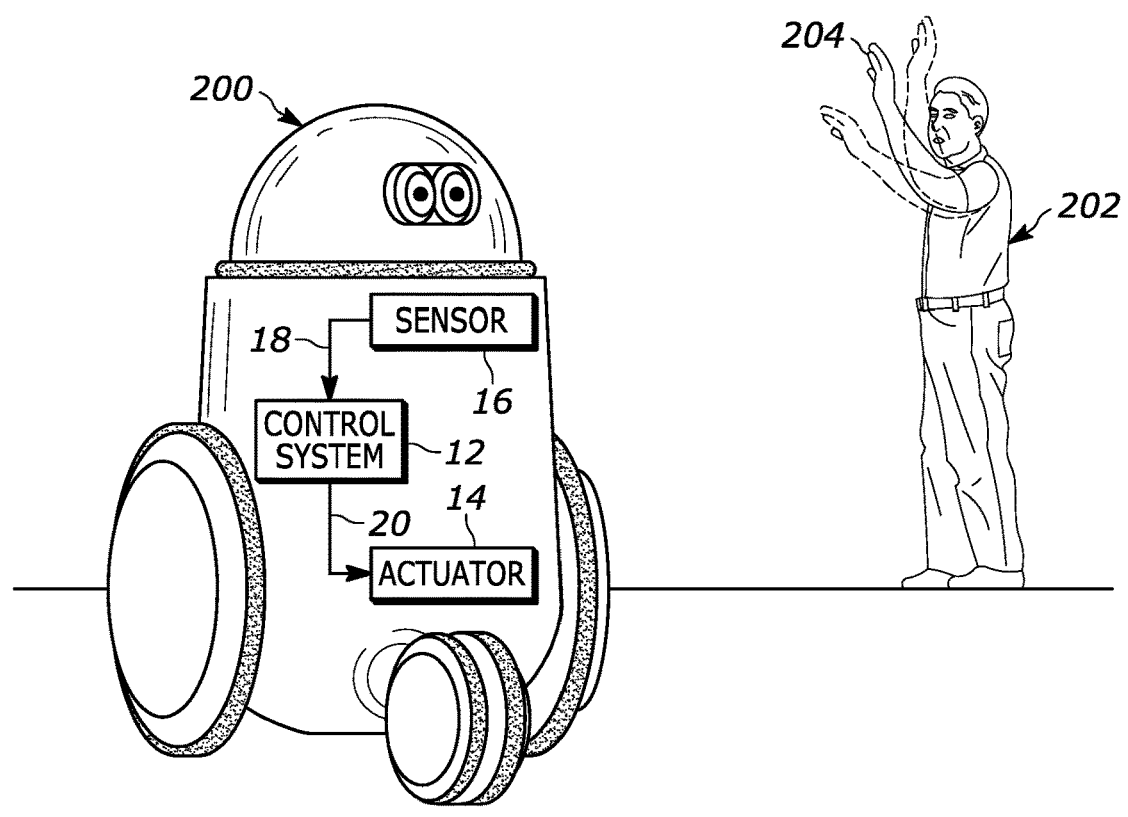
FIG. 9 depicts a schematic diagram of the control system of FIG. 1 configured to control an automated personal assistant.

FIG. 9 depicts a schematic diagram of control system 12 configured to control automated personal assistant 900. Control system 12 may be configured to control actuator 14, which is configured to control automated personal assistant 900. Automated personal assistant 900 may be configured to control a domestic appliance, such as a washing machine, a stove, an oven, a microwave or a dishwasher.

Sensor 16 may be an optical sensor and/or an audio sensor. The optical sensor may be configured to receive video images of gestures 904 of user 902. The audio sensor may be configured to receive a voice command of user 902.

Control system 12 of automated personal assistant 900 may be configured to determine actuator control commands 20 configured to control system 12. Control system 12 may be configured to determine actuator control commands 20 in accordance with sensor signals 18 of sensor 16. Automated personal assistant 900 is configured to transmit sensor signals 18 to control system 12. Classifier 24 of control system 12 may be configured to execute a gesture recognition algorithm to identify gesture 904 made by user 902, to determine actuator control commands 20, and to transmit the actuator control commands 20 to actuator 14. Classifier 24 may be configured to retrieve information from non-volatile storage in response to gesture 904 and to output the retrieved information in a form suitable for reception by user 902.

Figure 10:
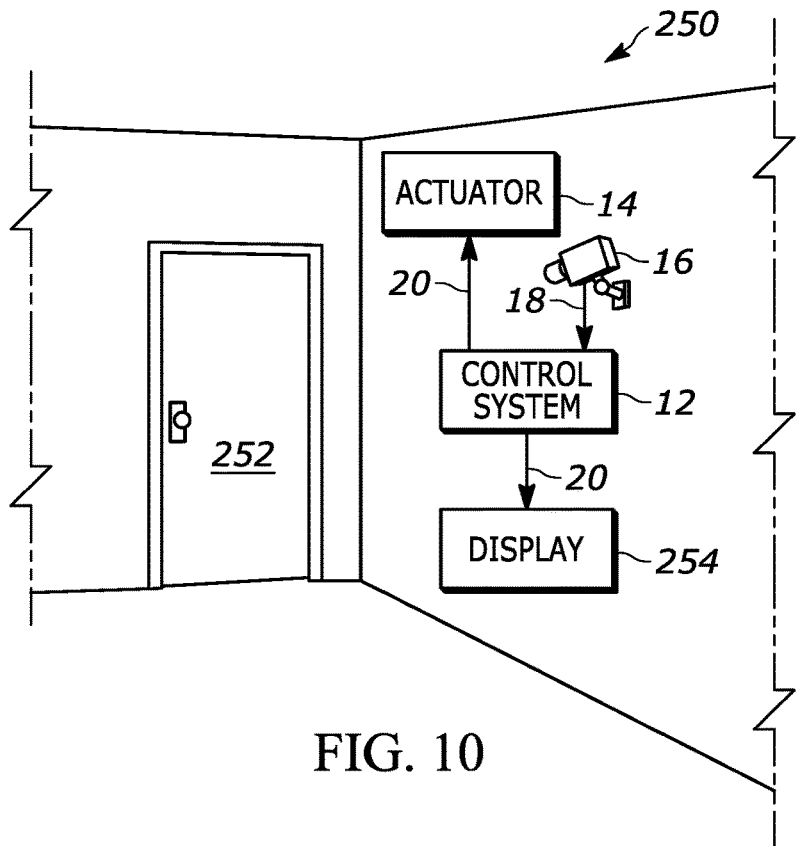
FIG. 10 depicts a schematic diagram of the control system of FIG. 1 configured to control a monitoring system, such as a control access system or a surveillance system.

FIG. 10 depicts a schematic diagram of control system 12 configured to control monitoring system 250. Monitoring system 250 may be configured to physically control access through door 252. Sensor 16 may be configured to detect a scene that is relevant in deciding whether access is granted. Sensor 16 may be an optical sensor configured to generate and transmit image and/or video data. Such data may be used by control system 12 to detect a person's face.

Classifier 24 of control system 12 of monitoring system 250 may be configured to interpret the image and/or video data by matching identities of known people stored in non-volatile storage 26, thereby determining an identity of a person. Classifier 24 may be configured to generate and an actuator control command 20 in response to the interpretation of the image and/or video data. Control system 12 is configured to transmit the actuator control command 20 to actuator 14. In this embodiment, actuator 14 may be configured to lock or unlock door 252 in response to the actuator control command 20. In other embodiments, a non-physical, logical access control is also possible.

Monitoring system 250 may also be a surveillance system. In such an embodiment, sensor 16 may be an optical sensor configured to detect a scene that is under surveillance and control system 12 is configured to control display 254. Classifier 24 is configured to determine a classification of a scene, e.g. whether the scene detected by sensor 16 is suspicious. Control system 12 is configured to transmit an actuator control command 20 to display 254 in response to the classification. Display 254 may be configured to adjust the displayed content in response to the actuator control command 20. For instance, display 254 may highlight an object that is deemed suspicious by classifier 24. Utilizing an embodiment of the system disclosed, the surveillance system may predict objects at certain times in the future showing up.

Figure 11:
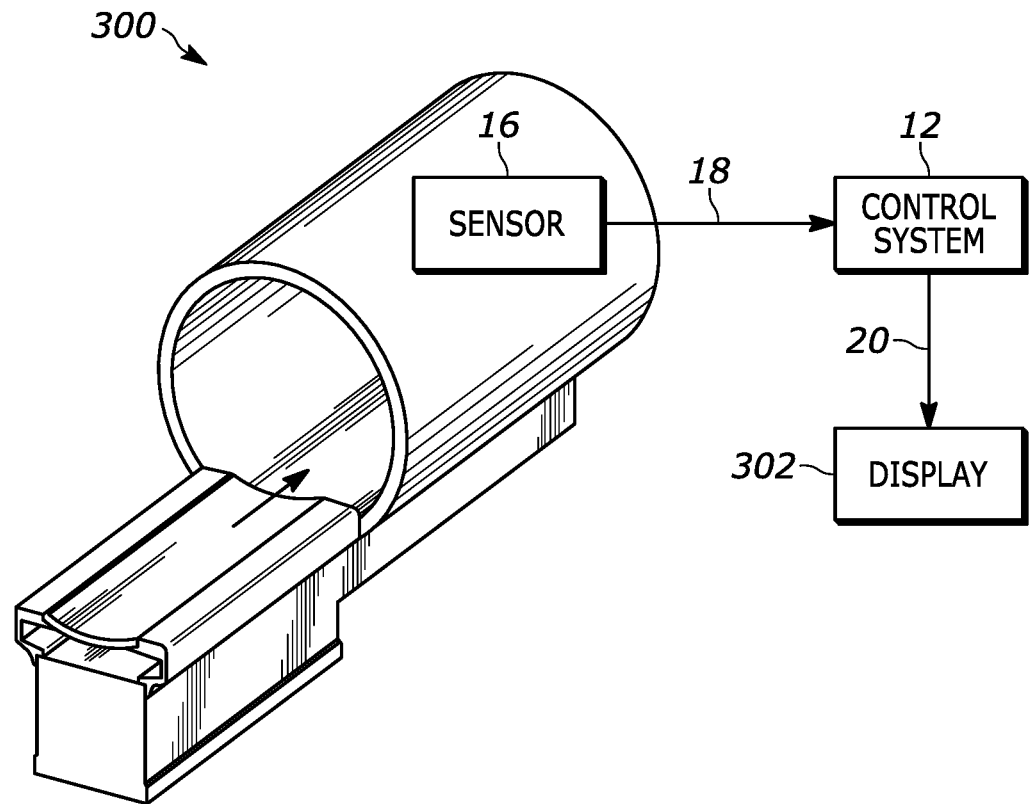
FIG. 11 depicts a schematic diagram of the control system of FIG. 1 configured to control an imaging system, for example an MM apparatus, x-ray imaging apparatus or ultrasonic apparatus.

FIG. 11 depicts a schematic diagram of control system 12 configured to control imaging system 1100, for example an Mill apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification obtained by the trained neural network. For example, classifier 24 may interpret a region of a sensed image to be potentially anomalous. In this case, actuator control command 20 may be determined or selected to cause display 302 to display the imaging and highlighting the potentially anomalous region.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method utilizing a continuous discrete recurrent Kalman network, comprising:
   receiving, at an encoder, an input from one or more sensors, wherein the input includes one or more time series data associating data at one or more points in time, wherein the encoder is configured to network map an observation into a latent observation space;
   outputting, to a Kalman filter, a latent observation and uncertainty estimate in response to mapping of the input at the encoder and the latent observation space;
   determining a prior latent state and posterior latent state utilizing the Kalman filter configured to solve a Stochastic Differential Equation (SDE) associated with the prior latent state and posterior latent state; and
   outputting, via a decoder, a filtered observation utilizing at least the posterior latent state in response to the decoder mapping the prior latent state back to the input.

2. The computer-implemented method of claim 1, wherein the Kalman filter, the encoder, and the decoder each include model parameters configured to be trained with backpropagation in an end-to-end manner.

3. The computer-implemented method of claim 1, wherein the decoder is configured to map the filtered observation to the time series data.

4. The computer-implemented method of claim 1, wherein the input includes image sequences and the encoder and decoder include a convolutional neural network.

5. The computer-implemented method of claim 1, wherein the Kalman filter is a recurrent continuous-discrete Kalman filter.

6. The computer-implemented method of claim 1, wherein the method includes, utilizing the Kalman filter, outputting a discrete observation at an arbitrary time interval.

7. The computer-implemented method of claim 1, wherein the one or more sensors includes a camera, global positioning system (GPS) sensor, temperature sensor, oxygen sensor, speed sensor, or a vehicle sensor.

8. A system that includes a continuous discrete recurrent Kalman network, comprising:
   an encoder configured to receive an input from one or more sensors, wherein the input includes one or more time series data associating data at one or more points in time, wherein the encoder is configured to network map an observation into a latent observation space;
   a recurrent continuous-discrete Kalman filter configured to receive as output from the encoder, a latent observation and uncertainty estimate in response to the input at the encoder and the latent observation space, and further configured to determine prior latent state and posterior latent state; and
   a decoder configured to output a filtered observation utilizing at least the posterior latent state in response to the decoder mapping the prior latent state back to the input.

9. The system of claim 8, wherein the Kalman filter, the encoder, and the decoder each include model parameters configured to be trained with backpropagation.

10. The system of claim 8, wherein the latent observation is output in response to a stochastic differential equation.

11. The system of claim 8, wherein the decoder is configured to map the filtered observation to the time series data.

12. The system of claim 8, wherein the input includes image sequences and the encoder and decoder include a convolutional neural network.

13. The system of claim 8, wherein the Kalman filter is further configured to output a discrete observation at an arbitrary time interval.

14. The system of claim 8, wherein the one or more sensors includes a camera, global positioning system (GPS) sensor, temperature sensor, oxygen sensor, speed sensor, or a vehicle sensor.

15. A system that includes a continuous discrete recurrent Kalman network, comprising:
   a processor programmed to:
   receive, at an encoder, an input from one or more sensors, wherein the input includes one or more time series data associating data at one or more points in time, wherein the encoder is configured to network map an observation into a latent observation space;
   output, to a Kalman filter, a latent observation and an uncertainty estimate in response to the input at the encoder and the latent observation space;
   determine a prior latent state and posterior latent state utilizing the Kalman filter configured to solve a Stochastic Differential Equation (SDE) associated with the prior latent state and posterior latent state; and output, via a decoder, a filtered observation utilizing at least the posterior latent state in response to the decoder mapping the prior latent state back to the input.

16. The system of claim 15, wherein the processor is further programmed to output, via a decoder, a filtered observation utilizing at least the posterior latent state.

17. The system of claim 15, wherein the filtered observation indicates data associated with a future time.

18. The system of claim 15, wherein the Kalman filter is further configured to utilize the latent observation and the uncertainty estimate to update the prior latent state.

19. The system of claim 15, wherein the decoder is further configured to map the posterior latent state to an observation space.

20. The system of claim 15, wherein the Kalman filter is a recurrent continuous-discrete Kalman filter.

* * * * *